United States Patent [19]

Wesorick

[11] Patent Number: 5,178,003

[45] Date of Patent: Jan. 12, 1993

[54] ENGINE COMPONENT TEST APPARATUS

[75] Inventor: Richard S. Wesorick, Cincinnati, Ohio

[73] Assignee: General Electric Company, Cincinnati, Ohio

[21] Appl. No.: 738,384

[22] Filed: Jul. 31, 1991

Related U.S. Application Data

[63] Continuation-in-part of Ser. No. 602,538, Oct. 24, 1990, abandoned.

[51] Int. Cl.⁵ ............................................ G01M 19/00
[52] U.S. Cl. .................................................. 73/118.1
[58] Field of Search ................ 73/168, 118.1; 415/118

[56] References Cited

U.S. PATENT DOCUMENTS 4,774,905  10/1988  Nobis ................................. 118/306
4,854,569  8/1989  Mizuta ................................ 271/105

Primary Examiner—Robert Raevis
Attorney, Agent, or Firm—John R. Rafter; Jerome C. Squillaro

[57] ABSTRACT

A component test apparatus is provided for measuring the torque of an aircraft engine inducer nozzle to characterize the efficiency of the nozzle prior to engine launch. A frictionless mount rotatably supports a forward inner nozzle support which combines with the support to form a pressurizable plenum for communicatively discharging air through the nozzle and imparting annular motion to the apparatus characteristic of the efficiency of the nozzle.

16 Claims, 5 Drawing Sheets

ENGINE COMPONENT TEST APPARATUS

RELATED APPLICATION

This application is filed as a continuation-in-part application of U.S. patent application Ser. No. 07/602,538 for an Engine Component Test Apparatus, filed on Oct. 24, 1990, now abandoned.

FIELD OF THE INVENTION

The present invention relates to a component test apparatus and, more particularly, to a test apparatus for measuring the resultant torque produced by airflow through a test part such as an aircraft engine inducer nozzle. The actual measured torque can be compared with a predicted theoretical torque for the part and used to characterize the efficiency of the test part.

BACKGROUND OF THE INVENTION

Inducer nozzles can be circumferential channels connected to the inner flowpath of an aircraft engine and can direct a portion of the inner airflow to cool a rotor blade and disk and maintain its operating temperature within prescribed limits. It has been recognized that a 10% improvement in inducer efficiency can result in a reduction of 20° F. in rotor disk and blade temperatures.

Current inducer nozzles are believed to operate in an efficiency range of approximately 60% for rotor and stator systems. However, given the complexity of the engine and the interaction of the various components, it is difficult to analytically determine the causes of the low efficiency ratings. Moreover, heretofore no apparatus has been provided which allows the accurate testing of the inducer nozzle prior to installation in an aircraft engine, and thus efficiency testing has only been possible once the engine has been assembled. Consequently, there exists an unfulfilled need for a test apparatus which permits the accurate analysis and evaluation of an inducer nozzle system prior to engine launch.

SUMMARY OF THE INVENTION

Therefore, it is an object of the present invention to provide a test apparatus which permits the accurate analysis and evaluation of an inducer nozzle system prior to installation on an engine to allow the nozzle to be reconfigured as necessary to improve the efficiency of the nozzle and the rotor disk and blade cooling achieved thereby.

OBJECTS OF THE INVENTION

It is an object of the present invention to provide an adaptable component test apparatus configurable to receive different size and shape inducer nozzles therein.

It is a further object of the invention to provide an inducer test apparatus which is useful for determining inducer efficiency for a broad spectrum of nozzle configurations over a broad range of air pressure ratios.

In a preferred embodiment, the inducer test apparatus comprises means such as an open-faced mounting bracket for supporting an inducer nozzle and forming a plenum therewith, means for mounting the plenum for frictionless rotation, means for supplying pressurized air to the plenum and nozzle and means for measuring a resultant torque. In a preferred embodiment, the frictionless surface can comprise a circumferential air bearing and pressurized air can be supplied to the nozzle through a plenum.

The foregoing and other objects, features and advantages of the present invention will become more apparent from the following detailed description of the preferred embodiments when taken in conjunction with the accompanying drawings in which FIG. 1 is a cross-sectional illustration of a high bypass turbofan engine which may employ an inducer tested in accordance with the present invention.

DETAILED DESCRIPTION OF THE INVENTION

Figure 1:
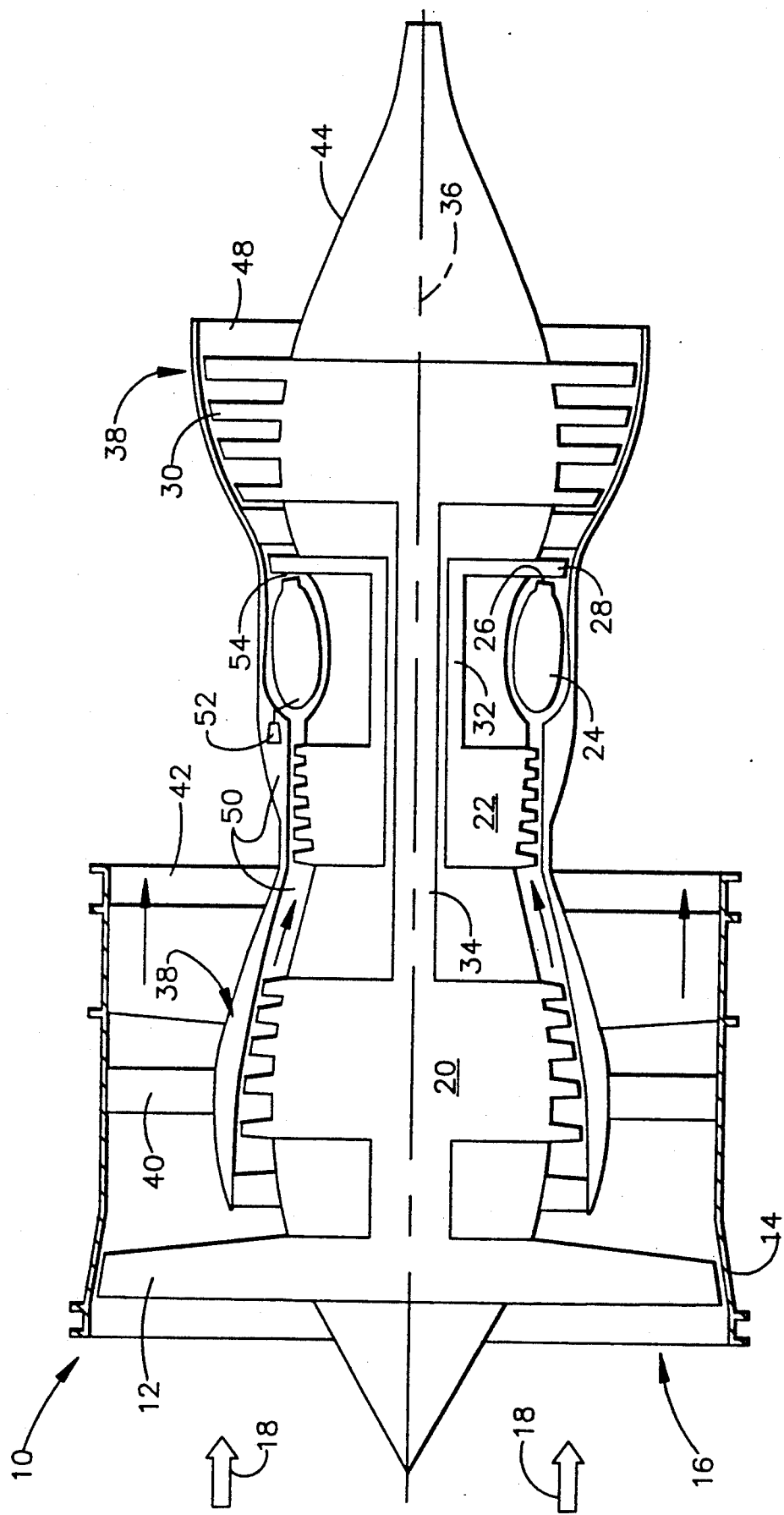

Referring now to the drawings, wherein like reference numerals have been used for similar elements throughout, FIG. 1 illustrates a cross-sectional schematic view of a high bypass turbofan engine 10 effective for powering an aircraft (not shown) in flight. The engine 10 includes a conventional fan 12 disposed inside a fan cowl 14 having an inlet 16 for receiving ambient airflow 18. Disposed downstream of the fan 12 is a conventional low pressure compressor (LPC) 20 followed in serial flow communication by a conventional high pressure compressor (HPC) 22, and a combustor 24. In accordance with a preferred and exemplary embodiment of the present invention, a conventional high pressure turbine nozzle 26, a conventional high pressure turbine (HPT) 28, and a conventional low pressure turbine (LPT) 30. The HPT 28 is conventionally fixedly connected to the HPC 22 by a high pressure (HP) shaft 32 and together with the combustor 24 form the high pressure system of the engine. The LPT 30 is conventionally connected to the LPC 20 by a conventional LP shaft 34 which is also conventionally fixedly connected to the fan 12 and together these components form the low pressure system of the engine. The engine 10 is symmetrical about a longitudinal centerline axis 36 disposed coaxially with the HP and LP shafts 32 and 34.

The fan cowl 14, is conventionally and fixedly attached to and spaced from the outer casing 38 by a plurality of circumferentially spaced conventional struts 40 defining therebetween a conventional annular fan bypass duct 42. The outer casing 38 surrounds the engine 10 from the LPC 20 to the LPT 30. A conventional exhaust cone 44 is spaced radially inward from the casing 38 and downstream of the LPT 30, and can be fixedly connected thereto by a plurality of conventional circumferentially spaced frame struts to define an annular core outlet 48 of the engine 10.

During operation, the airflow 18 is compressed in turn by the LPC 20, the HPC 22, and is then provided as pressurized compressed airflow 50 to the combustor 24. Conventional fuel injection means 52 provides fuel to the combustor 24 which is mixed With the compressed airflow 50 and undergoes combustion in the combustor 24 for generating combustion discharge gases 54 which in turn flow through the HPT 28 and the LPT 30 wherein energy is extracted from the airflow. The combustor discharge airflow rotates the HPT 28 and the connected HP shaft 32 to rotate the HPC 22. The compressor discharge airflow also rotates the the LPT 30 and its connected shaft LP shaft 34 for driving the the LPC 20 and the fan 12 respectively.

Figure 2:
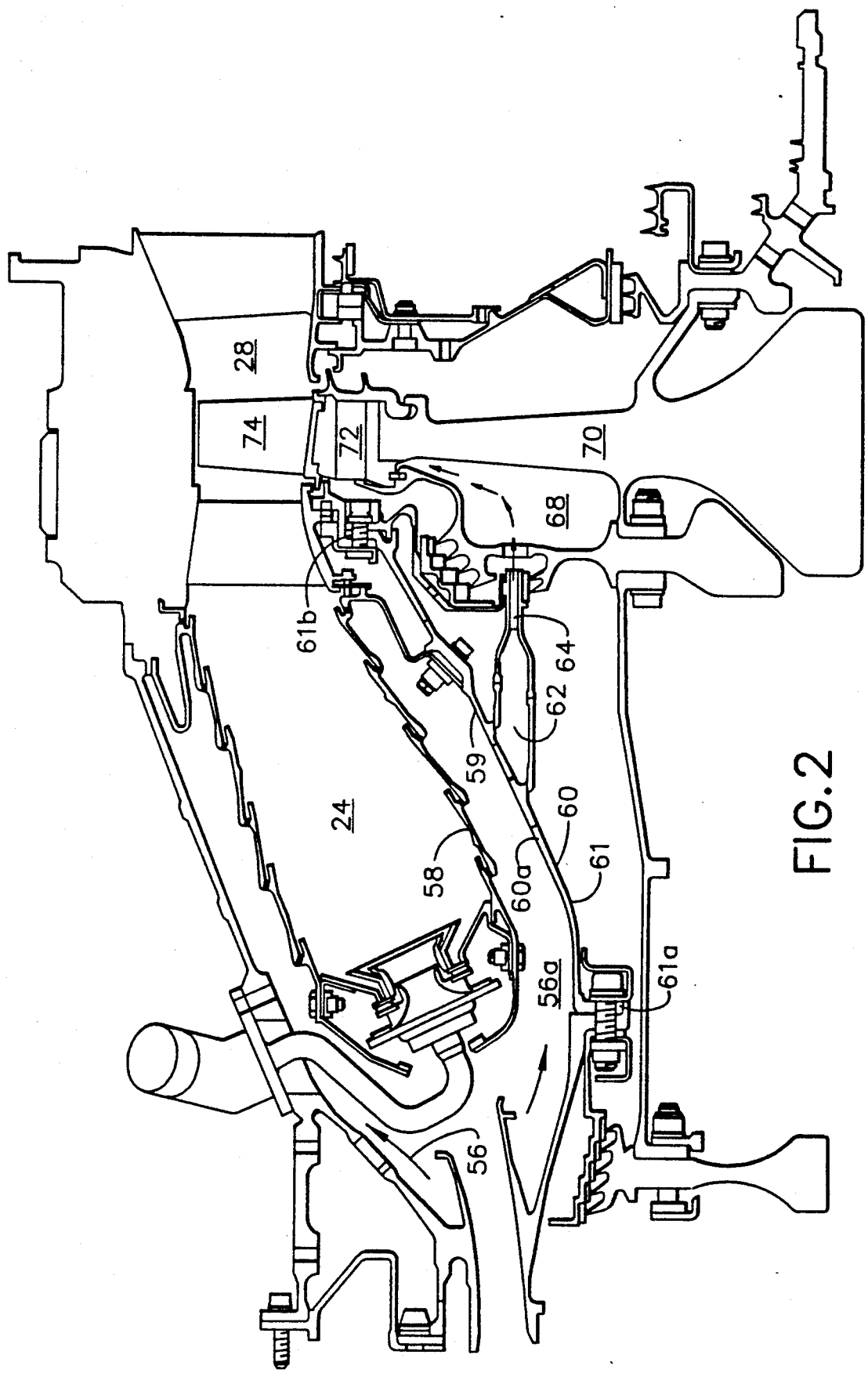
FIG. 2 is an illustration of an inducer nozzle including a cooling path directed at the blade roots.

FIG. 2 is a cross-sectional illustration of a portion of an engine cross section enlarged with respect to that of FIG. 1 illustrating the rearward portion of the combustor 24 and a portion of the high pressure turbine 28. A flowpath 56 surrounds the combustor 24 and an inner flowpath 56a is defined by an inside wall 58 of the combustor 24 and an inside surface 60a of a forward inner nozzle support (FINS) nozzle 60. The FINS 60 is shown to comprise a supply channel 62 and an inducer 64. The FINS 60 can be bolted by forward and aft mounting flanges 61a and 61b, respectively. The supply channel 62 is in direct communication with the inner flowpath 56a and the inducer 64 has a cross-sectional area which is less than the cross-sectional area of the supply channel 62 for increasing the discharge pressure of the airflow therethrough. The inducer 64 is connected to a flowpath 56a which is in communication with a passageway 68 for routing cooling airflow to a rotor disk 70, a blade root 72, and a blade 74, including its internal and external passages.

In operation, the FINS 60 extracts compressed air diverted into the inner flowpath 56a forward of the combustor 24, and discharges air through its restricted inducer 64 to increase the pressurized cooling airflow to cool the rotor disk 70, the blade root 72 and the blade 74 to maintain turbine blade operating temperature within a desired range. Gases exiting the combustor 24 typically have a temperature in excess of 2200° F. while gases exiting the compressor exhibit temperatures of approximately 1400° F. and thus the airflow in the inner flowpath which is redirected by the FINS 60 can provide substantial cooling to the component parts of the HPT 28.

It is believed that some inducer nozzles 64 operate at low efficiencies. Inducer efficiency is a measure of how well the available pressure energy is translated into tangential swirl. It is difficult, to redesign an inducer nozzle 64 once an engine has been launched and accordingly a component test apparatus is provided to permit analytic evaluation of an inducer nozzle 64 prior to installation and engine launch to facilitate the redesign and improvement the efficiency thereof and to reduce the work effort expended in air used for cooling and also to improve the cooling capability of the nozzle and operating temperature of turbine blades.

Figure 3:
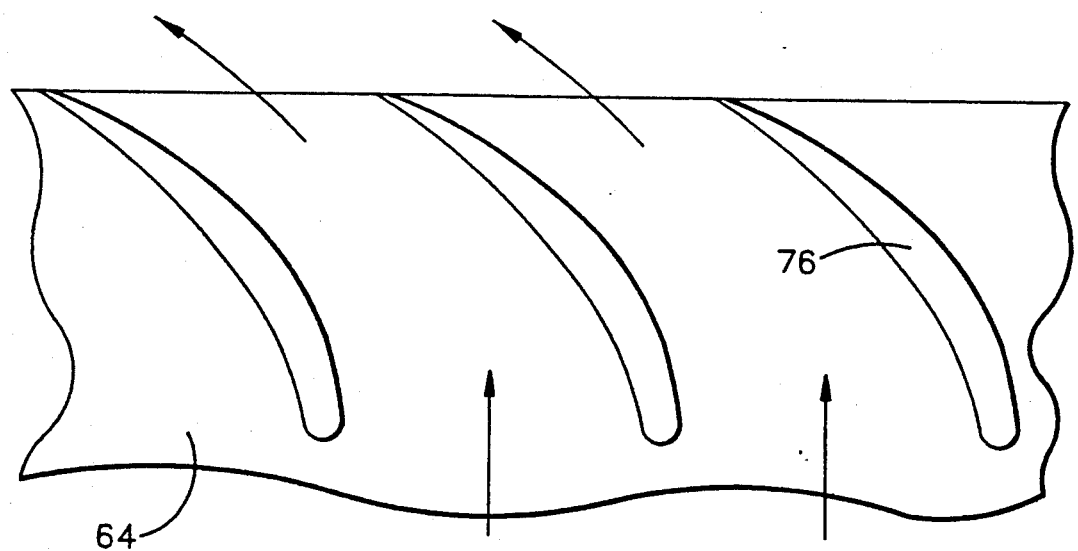
FIG. 3 is an illustration of a cross section of an inducer nozzle jet.

A cross-sectional illustration of a inducer 64 is shown in FIG. 3, wherein each inducer 64 can include one or more curved vanes 76 which provide a flow acceleration and impart an angular velocity or swirl to the airflow to cause the discharged cooling air to travel in a direction similar to the direction of turbine rotation to minimize the drag effect which the cooling air might otherwise have on the turbine rotor 70. Pre-swirling blade cooling air via the inducer jet vanes reduces the cooling air temperature relative to the rotor. A 1% improvement in induced efficiency can provide a 2% reduction in blade cooling air temperature.

Figure 6:
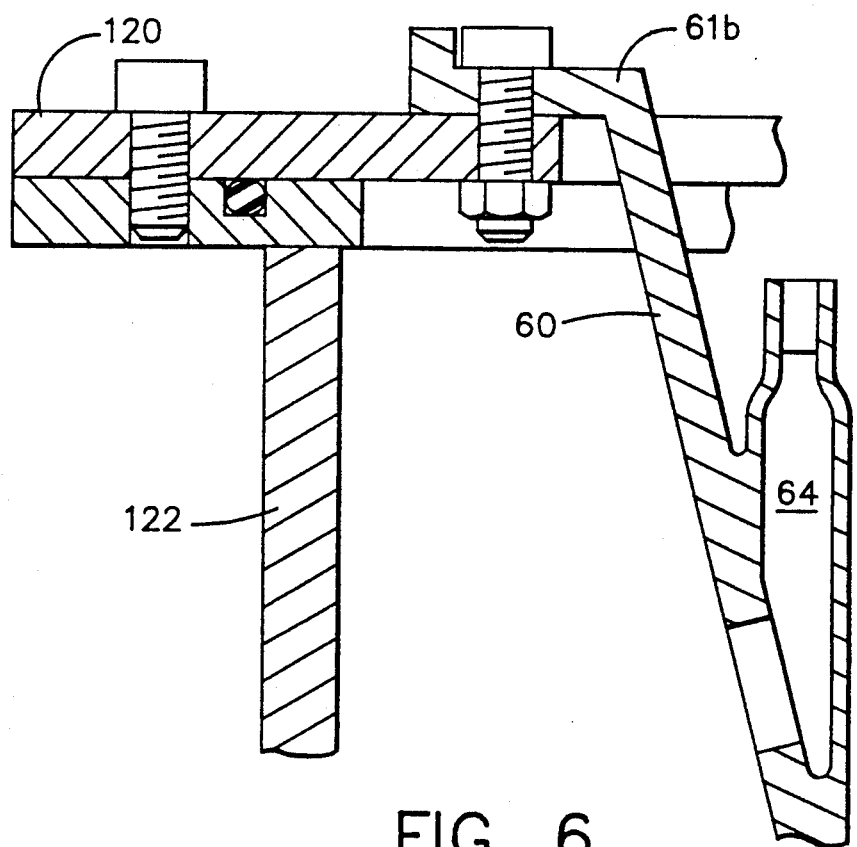
FIG. 6 is an illustration of an enlargement of a portion of the apparatus shown in FIG. 5.
Figure 4:
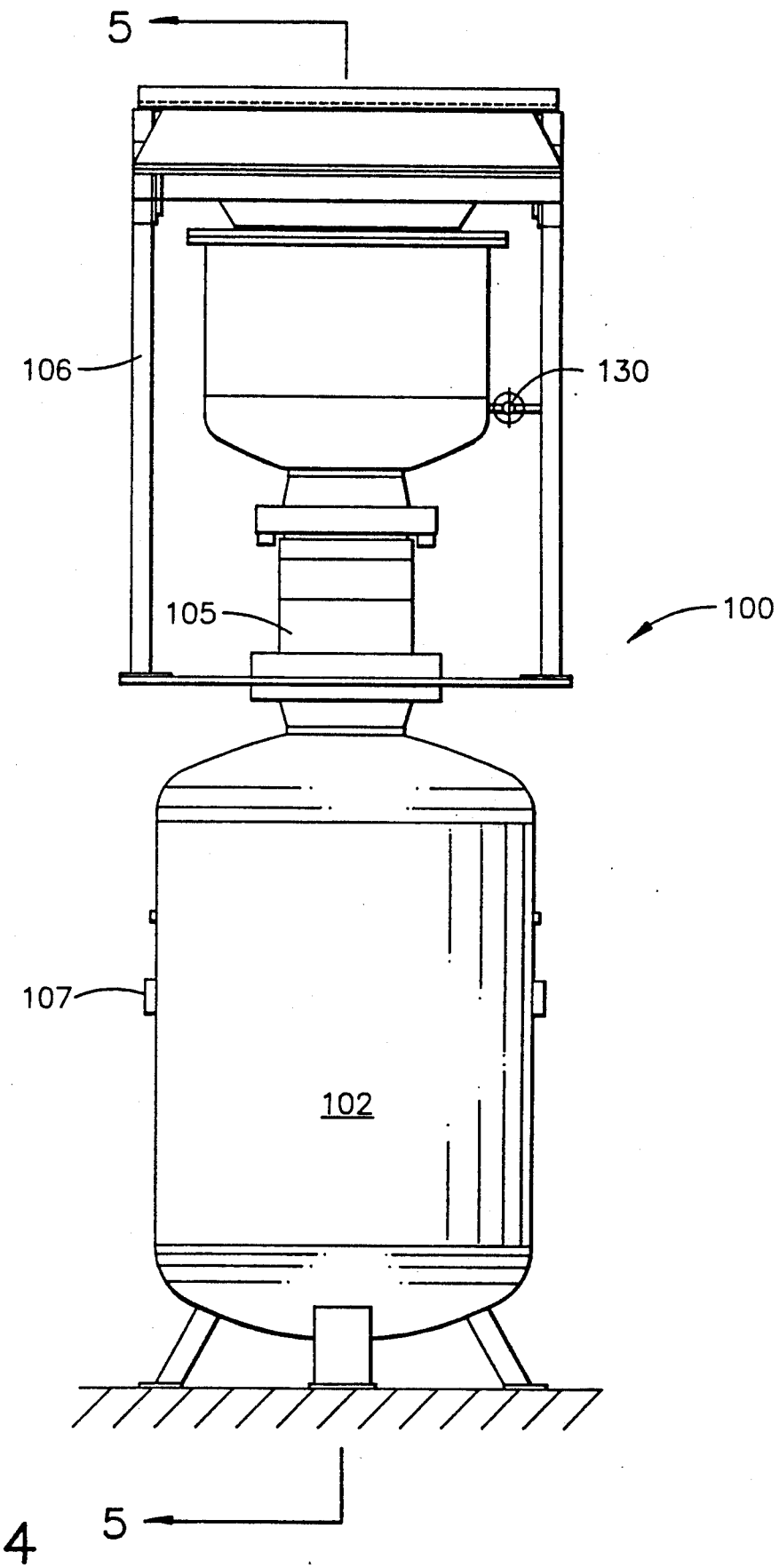
FIG. 4 is an illustration of a cross-sectional view of a component test apparatus in accordance with the present invention.
Figure 5:
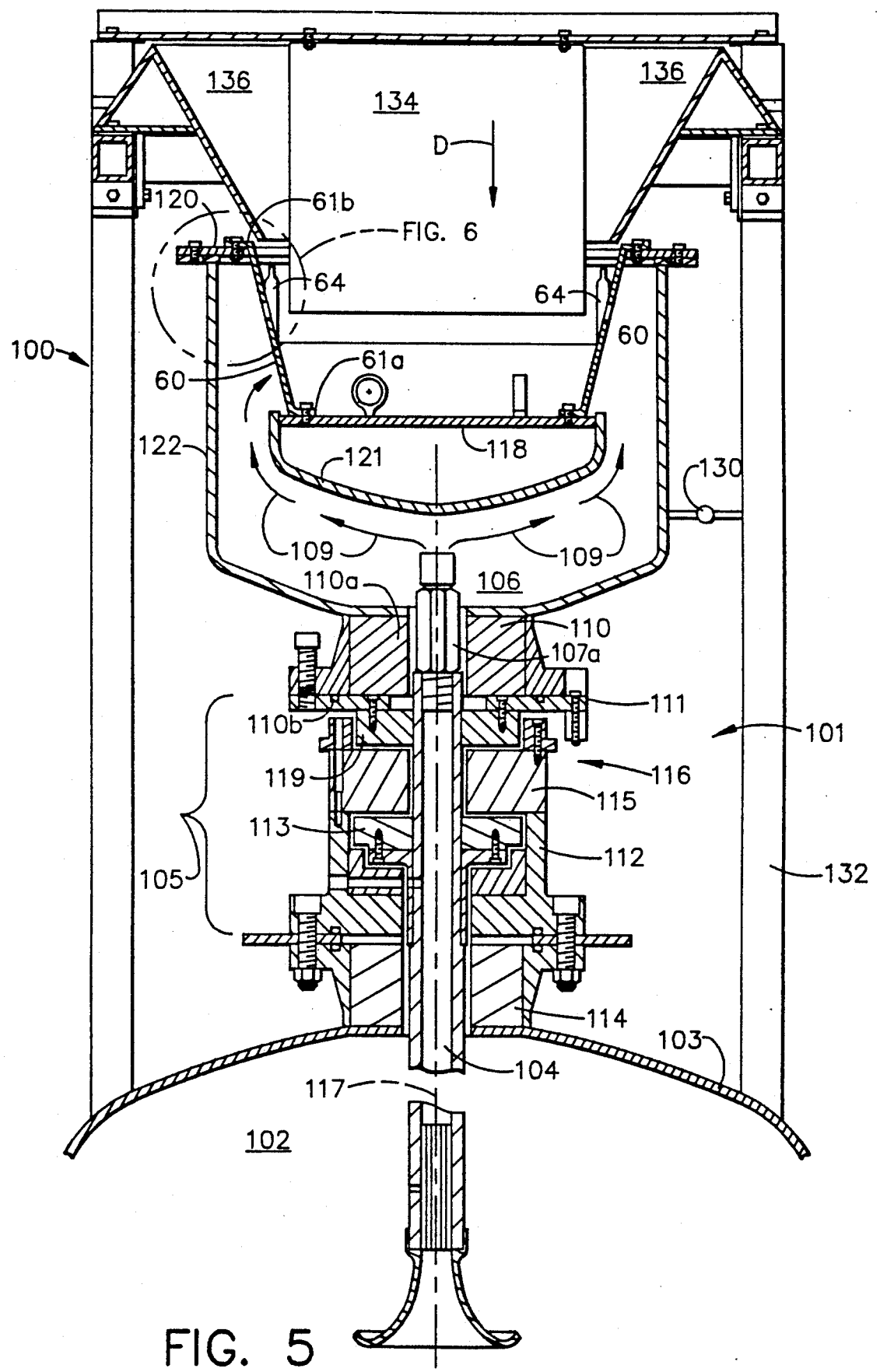
FIG. 5 is an illustration of a specific embodiment of the present invention.

Referring now to FIGS. 4, 5, and 6, a component test apparatus 100 in accordance with the present invention is shown to comprise a frictionless mount 101 rotatably supporting a venturi tube 104 and associated test part plenum 106 from an air supply plenum 102. The mount 101 can comprise an air supply plenum mount bracket 114 which is secured an outer shell 103 of the air supply plenum 102, an air bearing sub assembly 105 and a test plenum mounting bracket 110. On its upper end, the venturi tube 104 is inserted into the test part plenum 106. The venturi tube 104 is supported in the mount 101 by an air bearing subassembly 105 which rotatably secures the venturi tube 104 in a frictionless mount to the air supply plenum 102. As will be discussed in more detail below, the venturi supply tube 104 and the associated test part plenum 106 can rotate on the air bearing subassembly 105, in a substantially frictionless manner relative to the air supply plenum 102 and an exterior fixed support 132 while maintaining a substantially sealed connection between the venturi tube 104 and the supply plenum 102. The air supply plenum 102 can be pressurized via air supply port 107 and the venturi supply tube 104 which is sealed relative to the test part plenum 106 can provide pressurized air to the test plenum 106 and a FINS 60 including an inducer nozzle 64 mounted therein. In a preferred embodiment, the flow rate of the air exiting the venturi supply tube 104 and entering the test part plenum 106 is controlled by a flow meter nozzle 107a which can be obtained from Flow-Dyne Engineering, Inc., Forth Worth, Tex. 76107. Additionally, the temperature of the air in the test part plenum can measured.

The frictionless mount 101 can comprise a cylindrical mounting bracket 110 fixedly attached, along its upper surface 110a, to the test part plenum 106. The lower surface of test part plenum mounting bracket 110 is fixedly attached to the air bearing subassembly 105 through an air bearing adaptor plate 111. The air bearing subassembly 105 is captured between the test part plenum mounting bracket 110 and the air supply plenum mounting bracket 114 and comprises an air bearing adaptor plate 111, an air bearing 116, and air bearing support housing 112. The air bearing 116 includes an upper thrust plate 119, a stator 115, and a lower thrust plate 113. The upper thrust plate is fixedly attached to the air bearing adaptor plate 111. The lower thrust plate 113 is enclosed by the bearing support housing 112 and the support housing 112 is fixedly attached to both the bearing stator 115 and the air supply plenum mount bracket 114. The venturi tube 104 is supported by upper thrust plate 119 and lower plate 113 due to diametered interference fits between the venturi tube 104 and the upper and lower thrust plates 113 and 119 respectively. These interference fits also seal the the venturi tube 104 relative to the test part plenum 106 and the air supply plenum 102. On its upper end the venturi tube 104 passes through an opening in the test part plenum mounting bracket 110 and extends into the test part plenum 106. On it's lower end, the venturi tube 104 passes through opening in the bearing support housing 112 and the air supply plenum mounting bracket 114 and into the air supply plenum 102. The air bearing 116 can be a Block-Head Universal Air bearing available from Professional Instruments Company, 4601 Highway 7, Minneapolis, Minn. 55416 and described in U.S. Pat. Nos. 3,305,282 and 3,472,565.

An external air supply can be used to pressurize the air bearing 116 through ports located on the bearing stator 115, by a method commonly known in the art. The pressurized air impinges on the upper and lower thrust plates 119 and 113, respectively along the surfaces of the plates which interface with the bearing stator 115 thereby providing for substantially frictionless rotation. The pressurized air also exits the bearing stator 115 along a surface of revolution which surrounds the venturi tube 104, impinging on the venturi tube 104, and ensuring that the venturi tube 104 also rides on a cushion of air relative to the bearing support housing 112, thereby permitting substantially frictionless rotation of the venturi tube 104. The air bearing subassembly 105 is preferably configured to allow rotational movement in a plane substantially perpendicular to the axis 117 of the venturi supply tube. The following parts are free to rotate about axis 117: test part plenum 106; test part plenum mount bracket 110; air bearing adaptor plate 111; upper thrust plate 119; lower thrust plate 113; and venturi supply tube 104. The following parts remain stationary: bearing stator 115; bearing support housing 112; air supply plenum mount bracket 114; and air supply plenum 102. In a preferred embodiment, the venturi supply tube 104 ca be mounted in a vertical orientation and the test part plenum 106 and venturi supply tube 104 can be allowed to rotate in a substantially horizontal plane. Although the air bearing subassembly is configured to allow rotational movement in a plane substantially perpendicular to the axis 117, it virtually eliminates angular displacement in a plane substantially parallel to axis 117 due to the use of both upper and lower thrust plates 119 and 113, respectively and due to the configuration of the thrust plate which include relatively short and relatively large diameter shafts, thereby resisting overturning moments. Additionally, axial movement perpendicular to axis 117 is virtually prevented by the air bearing subassembly 105. Air from a separate source is provided to port 107 located on the air supply plenum 102 by a method commonly known in the art. The venturi supply tube 104 then channels the pressurized air to the test part plenum 106. Upon entering the test part plenum 106, the air is deflected by deflector 121, as depicted by arrows 109 in FIG. 5. The air then travels through the annular channel created by deflector 121 and the annular-shaped, open-faced mounting bracket 122 until it reaches a mounted FINS 60 and inducer nozzle 64, as depicted by arrows 109 in FIG. 5. The air then exits through the top of the test apparatus, channeled by inner shroud 134 and outer shroud 136.

The test part plenum 106 can comprise a FINS 60 blank off plate 118, a FINS adaptor plate 120, air deflector 121, annular-shaped, open-faced mounting bracket 122, and the forward inner nozzle support 60. The FINS blank-off plate 118 fixedly and sealingly receives the forward mounting flange 61a of the FINS 60 as shown in FIGS. 2 and 5. The FINS adaptor plate 120 fixedly and sealingly receives the aft mounting flange 61b of the FINS 60, as shown in FIGS. 5 and 6. The FINS blank-off plate 118 and the FINS adaptor plate 120 can be specially configured for use with a particular FINS 60 and different plates can be used with FINS 60 of different configurations.

An exterior fixed support 132, which is used to support inner shroud 134 and outer shroud 136 as shown in FIG. 5, partially surrounds the test part plenum 106 and is fixedly attached to the air supply plenum outer shell 103. A load cell 130 is attached between the annular-shaped, open-faced mounting bracket 122 and the exterior fixed support 132 in order to measure load deviations as the test apparatus is operated. A typical load cell is available from Eaton Corporation, Lebow Products, 1729 Maplelawn Rd., PO Box 1089, Troy, Mich. 48099, as a model 3167-25 load cell. As the test plenum 106 rotates in its air bearing subassembly 105, the load cell 130 measures the turning force F being exerted on the load cell 130 by the test part plenum 106. Inducer efficiency can be calculated based on measured (actual) force and ideal (theoretical) force according to the following derivation:

Mathematically

Force = mass*acceleration $F_{inducer} = ma = m\Delta V_t / t$ $F_{inducer,actual} = m(V_{t,exit,actual} - V_{t,inlet})$ Since $V_{t,inlet} = 0$, $F_{inducer,actual} = mV_{t,exit,actual}$ Also, $F_{inducer,actual} = (F_{load\ cell} * R_{load\ cell}) / R_{inducer}$ For a given pressure ratio $P_t P_s$ across the inducer, $V_{exit,ideal} = Ma$ where $$M = \sqrt{\frac{2}{\gamma_1}\left[\frac{P_t^{\gamma_1}}{P_s}\gamma - 1\right]} \text{ and } a = \sqrt{\gamma g_c R T_s}$$

where $T_s$ is the ambient temperature at the inducer exit

Also, $V_{t,exit,ideal} = V_{exit,ideal} \cos \alpha$, where $\alpha$ is the inducer exit angle $F_{inducer,ideal} = mV_{t,exit,ideal}$ From enthalpy considerations, $\eta = \Delta H_{actual} / \Delta H_{ideal} = (V_{t,exit,actual} / V_{t,exit,ideal})^2 = (F_{inducer,actual} / F_{inducer,ideal})^2$ In operation, a forward inner nozzle support 60 is sealingly attached to the FINS blank-off plate 118 and the FINS adaptor plate 120 to form a sealed test plenum 106. The supply tank 102 can be pressurized with external air and supplies air through the venturi supply tube 104 to pressurize the test plenum 106. As was explained in relation to FIG. 3, the inducer 64 contains vanes 76 which provide a discharge airflow having an angular component so that the air exiting the FINS 60 swirls and the mounted FINS 60 in reaction to the exit of swirling air turns or rotates with its support structure as permitted by the air bearing subassembly as described previously, in response to reactive force developed by the inducer 64. The load cell 130 attached to the test plenum 106 detects the force produced by the FINS 60 in response to air discharged through the circumferential inducer 64 to allow an empirical evaluation of the efficiency of the inducer.

While the foregoing description sets forth the preferred embodiments of the present invention in particular detail, it must be understood that numerous modifications, substitutions and changes can be undertaken without departing from the true spirit and scope of the present invention. In particular, other frictionless mounts, load cells and plenum constructions can be employed to practice this invention. Accordingly, the protection desired to be secured by Letters Patent for this invention is defined by the subject matter of the following claims.

What is claimed is:

1. A component test apparatus for evaluating airflow efficiency in a vaned inducer nozzle comprising:
   (a) sealing means for supporting a forward inner nozzle support including an inducer nozzle and forming a first plenum with said forward inner nozzle support, said first plenum having a primary axis;
   (b) means for supplying pressurized air to said first plenum;

(c) an exterior support structure partially surrounding said first plenum;

(d) a frictionless support means for demountably supporting said first plenum for substantially frictionless rotation relative to said exterior support structure in a first direction and only in a first plane substantially perpendicular to said primary axis in response to an airflow through said nozzle; and (e) measuring means attached to said first plenum and to said exterior support for measuring a force produced by rotation of said first plenum in response to said applied airflow exiting said vaned inducer nozzle wherein said force is linearly related to airflow.

2. The component test apparatus of claim 1 wherein said test apparatus includes a forward inner nozzle support comprising an annular channel having an inducer nozzle projecting from a first side thereof.

3. The component test apparatus of claim 2 wherein said inducer nozzle includes a plurality of vanes fixedly mounted in said inducer nozzle for imparting a swirl to an airflow through said inducer nozzle.

4. The component test apparatus of claim 2 wherein said inducer nozzle is circumferential.

5. The component test apparatus of claim 2 wherein:
(a) said forward inner nozzle support includes
   (i) a forward flange mount
   (ii) an aft flange mount
(b) said sealing means comprises:
   (i) a forward inner nozzle support adaptor plate
   (ii) an annular-shaped, open faced mounting bracket having a first face for sealingly receiving said forward inner nozzle support aft flange mount;
   (iii) a forward inner nozzle support blank-off plate for sealingly receiving said forward inner nozzle support forward flange mount;
   (iv) an air deflector; and
(c) said forward inner nozzle support, said forward inner nozzle support adaptor plate, said annular shaped, open-faced mounting bracket, said forward inner nozzle support blank-off plate and said air deflector form a sealed chamber vented through said vaned inducer nozzle.

6. The component test apparatus of claim 5 wherein said an annular-shaped, open faced mounting bracket includes an adaptor plate for receiving said aft flange mount.

7. The component test apparatus of claim 5 wherein:
(a) said forward inner nozzle support vaned inducer nozzle includes a first surface for positioning adjacent an inner flowpath of an aircraft engine;

(b) said annular shaped, open faced mounting bracket includes an interior surface; and (c) said inducer nozzle first surface is positioned adjacent said interior surface of said annular shaped, open-faced mounting bracket.

8. The component test apparatus of claim 5 wherein said sealing means includes a hollow shaft fixedly attached to said annular-shaped, open faced bracket and mounted in said frictionless support comprising a circumferential air bearing, said hollow shaft being adapted for connection to a pressurized air supply plenum for pressurizing said first plenum and forward inner nozzle support.

9. The component test apparatus of claim 8 wherein said air bearing opposes axial movement of said shaft.

10. The component test apparatus of claim 1 wherein said sealing means comprises a circumferential 360° annular bracket.

11. The component test apparatus of claim 1 wherein said frictionless support means comprises an air bearing defining a guide for receiving a hollow shaft in rotational relationship therein.

12. The component test apparatus of claim 11 wherein said means for supplying pressurized air to said first plenum comprises a rotatable hollow shaft extending between a said first plenum and a supply of pressurized air.

13. The component test apparatus of claim 12 wherein said frictionless support means includes a face and said hollow shaft includes a substantially planar end face abutting said frictionless support means face.

14. The component test apparatus of claim 12 wherein said hollow shaft defines an air passageway for supplying pressurized air to said first plenum and said forward inner nozzle support and includes a flow meter for measuring air flow therethrough.

15. The component test apparatus of claim 1 wherein said means for measuring force comprises a load cell system.

16. A component test apparatus for evaluating airflow efficiency in an inducer nozzle comprising:
(a) means for demountably supporting a forward inner nozzle support, including an inducer nozzle, for substantially planar frictionless rotation in response to an airflow through said inducer nozzle;
(b) means coupled to said forward inner nozzle support for supplying air thereto and producing a torque which rotates said inducer nozzle about a fixed axis; and
(c) means for measuring said torque for the purpose of determining the efficiency of said inducer nozzle.

* * * * *